United States Patent
Witt et al.

(10) Patent No.: US 7,466,243 B2
(45) Date of Patent: Dec. 16, 2008

(54) SYSTEM AND METHOD FOR PASSIVE WIRE DETECTION

(75) Inventors: Christian C. Witt, Albuquerque, NM (US); Dennis J. Yelton, Albuquerque, NM (US); James C. Hansen, Albuquerque, NM (US); Christopher J. Musial, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 225 days.

(21) Appl. No.: 11/249,955

(22) Filed: Oct. 13, 2005

(65) Prior Publication Data

US 2007/0088984 A1    Apr. 19, 2007

(51) Int. Cl.
*G08B 21/00*    (2006.01)
(52) U.S. Cl. .................... 340/945; 340/971; 340/983; 250/330; 250/339.11
(58) Field of Classification Search ............... 340/945, 340/946, 971, 948, 961, 963, 973, 980, 982, 340/983, 260, 261; 250/330, 316.1, 338.1, 250/339.11, 341.8
See application file for complete search history.

(56) References Cited

U.S. PATENT DOCUMENTS

| | | | | |
|---|---|---|---|---|
| 4,685,143 A | * | 8/1987 | Choate | 382/170 |
| 4,736,439 A | * | 4/1988 | May | 382/262 |
| 4,742,557 A | * | 5/1988 | Ma | 382/172 |
| 4,970,701 A | * | 11/1990 | Kirkland | 367/131 |
| 5,245,588 A | * | 9/1993 | Kirkland | 367/131 |
| 6,940,994 B2 | * | 9/2005 | Nixon et al. | 382/100 |
| 2002/0153485 A1 | | 10/2002 | Nixon et al. | 250/330 |

FOREIGN PATENT DOCUMENTS

| JP | 7-306939 | * 11/1995 |
|---|---|---|
| JP | 7306939 | 11/1995 |

OTHER PUBLICATIONS

Nixon, Matthew D. et al.; "Improved obstacle detection using passive ranging"; Proceedings of SPIE, vol. 4713; Enhanced and Synthetic Vision 2002, Jul. 2002, pp. 18-29.

* cited by examiner

*Primary Examiner*—Danie lPrevil
(74) *Attorney, Agent, or Firm*—Klein, O'Neill & Singh, LLP

(57) ABSTRACT

A hardware system for passively detecting wires from a mobile transportation system is provided. The hardware system includes a main processor in the hardware system that uses plural commands to manage a preprocessor module and a linker module, wherein the pre-processing module pre-processes a digital image taken from a digital camera of the transport system and reduces non-wire like clutter from the digital image and identifies pixels that can be classified as wire like; and the linker module links the identified pixels to determine if a wire like structure is present and a binary output from the linker module is sent to an output select module that allows a user to select a video output.

14 Claims, 19 Drawing Sheets

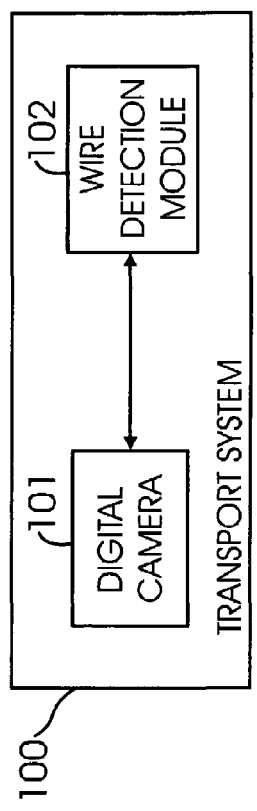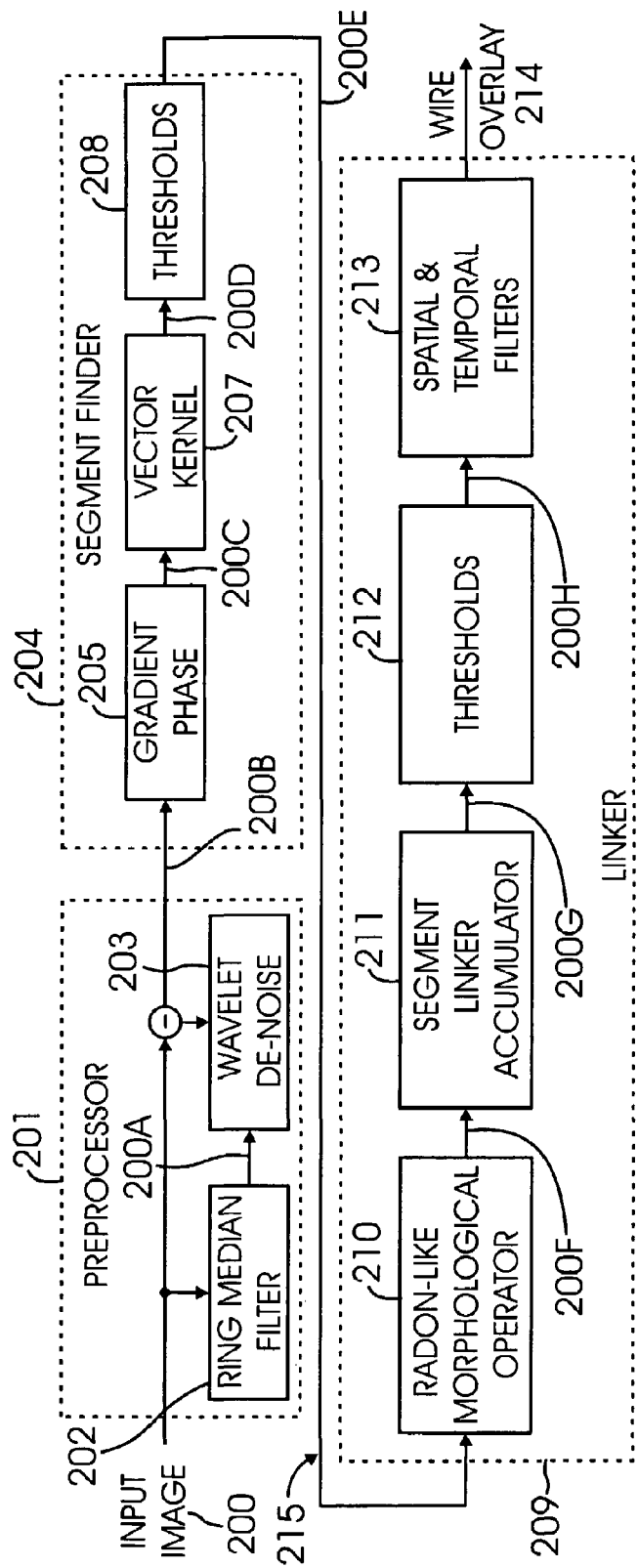
Fig. 1B
Fig. 2A

SYSTEM AND METHOD FOR PASSIVE WIRE DETECTION

CROSS REFERENCE TO RELATED APPLICATION

This patent application is related to U.S. patent application Ser. No. "11/184,572", entitled "System and Method For Passive Wire Detection", filed on Jul. 25, 2005, the disclosure of which is incorporated herein by reference in its entirety.

BACKGROUND OF THE INVENTION

1. Field of the Invention

The present invention relates to transport systems, and more particularly, to passive wire detection techniques.

2. Background

One of the leading causes of catastrophic in-flight helicopter and tilt-rotor aircraft (or any other transportation system, used interchangeably throughout this specification) accidents is due to contact with static objects, for example, contact with wires ("wire-strike"). Such accidents typically occur when a helicopter collides with power lines, wires or communications lines. Many of these accidents result in fatalities, and they are especially a problem during low altitude helicopter cruising and maneuvering.

Wires are oftentimes difficult to see by naked eye due to their small size, and this can be exacerbated even further by bad weather and visual clutter. FIG. 1A illustrates helicopter 10 flying towards wires 20 (power lines). If the pilot does not detect the power lines on time, then helicopter 10 can crash resulting in fatalities and loss of property.

Active wire sensors in helicopters could be used to mitigate this problem. An active sensor is a detection device that requires input energy from a source other than the target, which is being sensed. An example of an active sensor is a measuring instrument that generates a signal, transmits it to a target, and receives a reflected signal from the target. Information concerning the target is obtained by comparison of the received signal with the transmitted signal. Active sensors cannot be used in cases where stealth/secrecy is required, for example, military operations, and hence this is not a desirable solution for these applications.

Another potential solution is to use passive sensors. Passive sensor devices detect without emitting any energy signals that can cause them to be detected. The detection occurs as a result of radiation from the target or reflection of ambient energy on the target.

However, even with high resolution passive sensors, wires can be very difficult to see at minimum avoidance ranges because they are often sub-pixel, embedded in wire-like clutter, and/or have poor signal-to-noise ratio ("SNR").

Another option is to use real-time image processing to detect the wires. However, conventional real time processing techniques rely on a host of convolution and filtering techniques. Low latency requirements coupled with standard real time processing constraints place severe limits on the size of the convolution kernels and filter sizes. This in turn, degrades wire detection performance and reliability.

Therefore, there is a need for a method and system for parallel real-time passive wire detection techniques, which can efficiently detect wires and notify the pilot of wires to minimize the risk of wire prone accidents.

SUMMARY OF THE PRESENT INVENTION

In one aspect of the present invention, a hardware system for passively detecting wires from a mobile transportation system is provided. The hardware system includes a main processor in the hardware system that uses plural commands to manage a preprocessor module, a segment finder module, and a linker module, wherein the pre-processing module pre-processes a digital image taken from a digital camera of the transport system and reduces non-wire like clutter from the digital image, the segment finder module identifies pixels that can be classified as wire like, and the linker module links the identified pixels to determine if a wire like structure is present and reduces non wire like false alarms, and a binary output from the linker module is sent to an output select module that allows a user to select a video output.

The segment finder module includes a theta correction module that receives an input from a gradient filter and maps a theta value that is closest to a theta value used by a vector kernel operator.

A memory module provides a binary map to a temporal filter in the linker module so that a binary mask obtained from the linker module is updated based on historical binary data. The temporal filter provides a binary mask to a clustering module in the linker module that assigns sub-clusters and clusters to image pixels in the binary mask received from the temporal filter.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures:

FIG. 1B is a block diagram of a computing system used for passive wire detection, according to one aspect of the present invention;

FIG. 2A shows a block diagram of the overall system architecture for passive wire detection, according to one aspect of the present invention;

DETAILED DESCRIPTION OF THE PREFERRED EMBODIMENTS

To facilitate an understanding of the preferred embodiment, the general architecture of an overall transport system will be described. The specific architecture and operation of the preferred embodiments will then be described with reference to the general architecture.

Figure 1A:
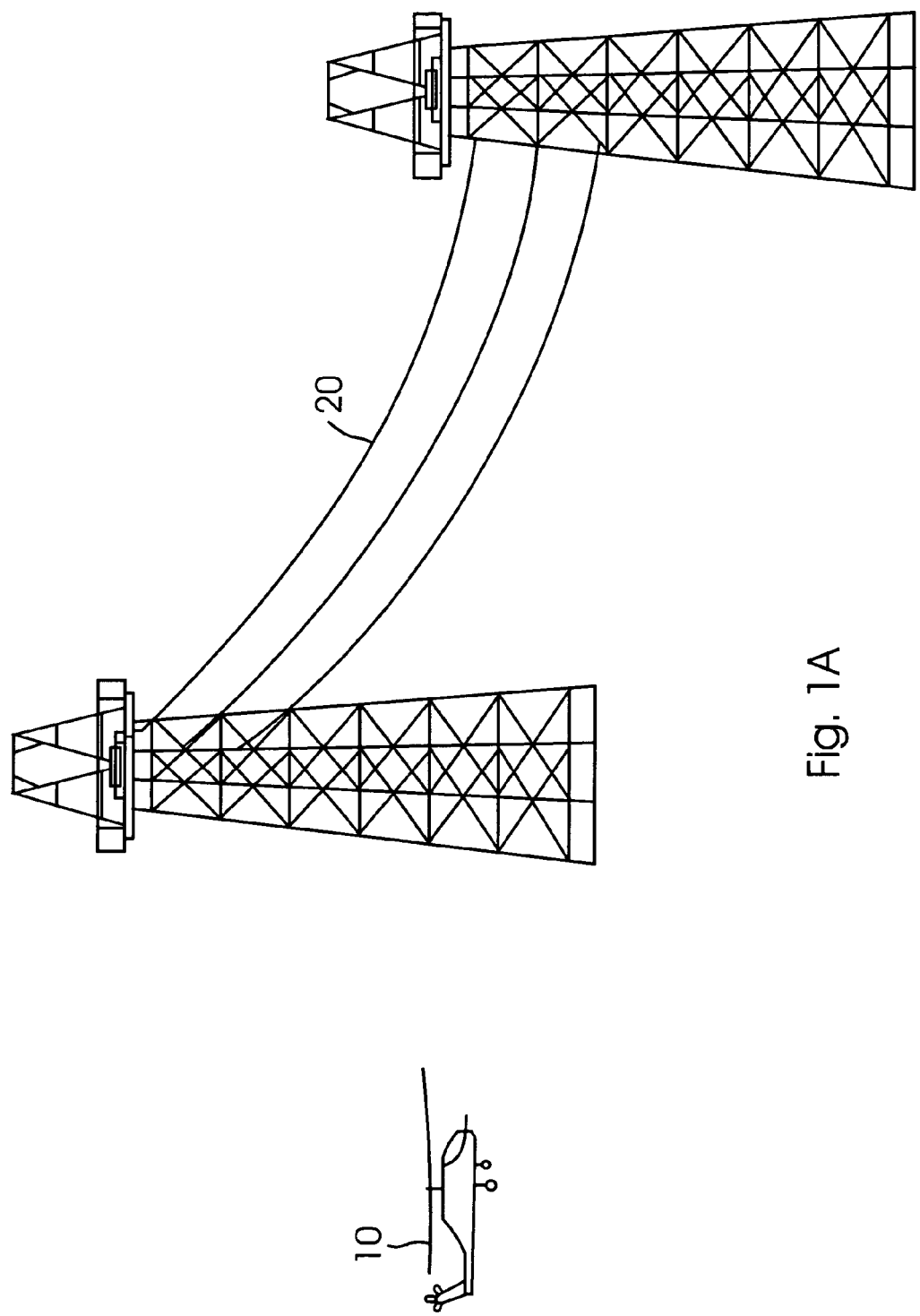
FIG. 1A shows how a helicopter can face wire structures while the helicopter is in flight.

FIG. 1B shows a top-level block diagram of a transport system (for example, a helicopter) 100 that includes a digital camera 101. The digital camera provides live real time images to a wire detection module 102 (or module 102) that is described in detail below. A digital camera interface (not shown) is also provided that allows module 102 to receive raw image data from a digital camera 101 or various digital cameras that are placed on the transport system 100. It is noteworthy that although one digital camera is shown in FIG. 1B, it is only intended to illustrate the adaptive aspects of the present invention. The adaptive aspects of the present invention are not limited to any particular number/type of cameras.

In one aspect of the present invention module 102 is a specialized application specific integrated circuit ("ASIC") or a field programmable gate array ("FPGA") that is used to efficiently detect wires in real time.

System Architecture for Passive Wire Detection:

FIG. 2A shows an overall block diagram of a system (102) according to one aspect of the present invention that passively detects wires. Input image 200 (i.e. raw digital image data) from digital camera (101) is received by a pre-processor segment 201. The pre-processor segment 201 removes non-wire like clutter from image data 200. Pre-processor 201 includes a ring median filter 202 and a wavelet de-noise module 203 that are used to initially filter the image. Ring median filter 202 and wavelet de-noise module 203 are described below in detail.

Output 200B from pre-processor 201 is sent to a segment finder module 204 that determines the degree to which each pixel's surroundings are wire like. Segment finder 204 includes a gradient phase module 205, a vector kernel 207 and a threshold module 208 (shown as Thresholds) that are described below in detail.

A linker module 209 receives output 200E from segment finder 204. The linker module 209 links various segments to build a wire like structure and based on that output 214, a wireless overlay is generated. Linker module 209 includes a radon-like morphological operator 210, a segment linker accumulator 211, threshold module 212 and spatial and temporal filter module 213 that are described below in detail.

Figure 2B:
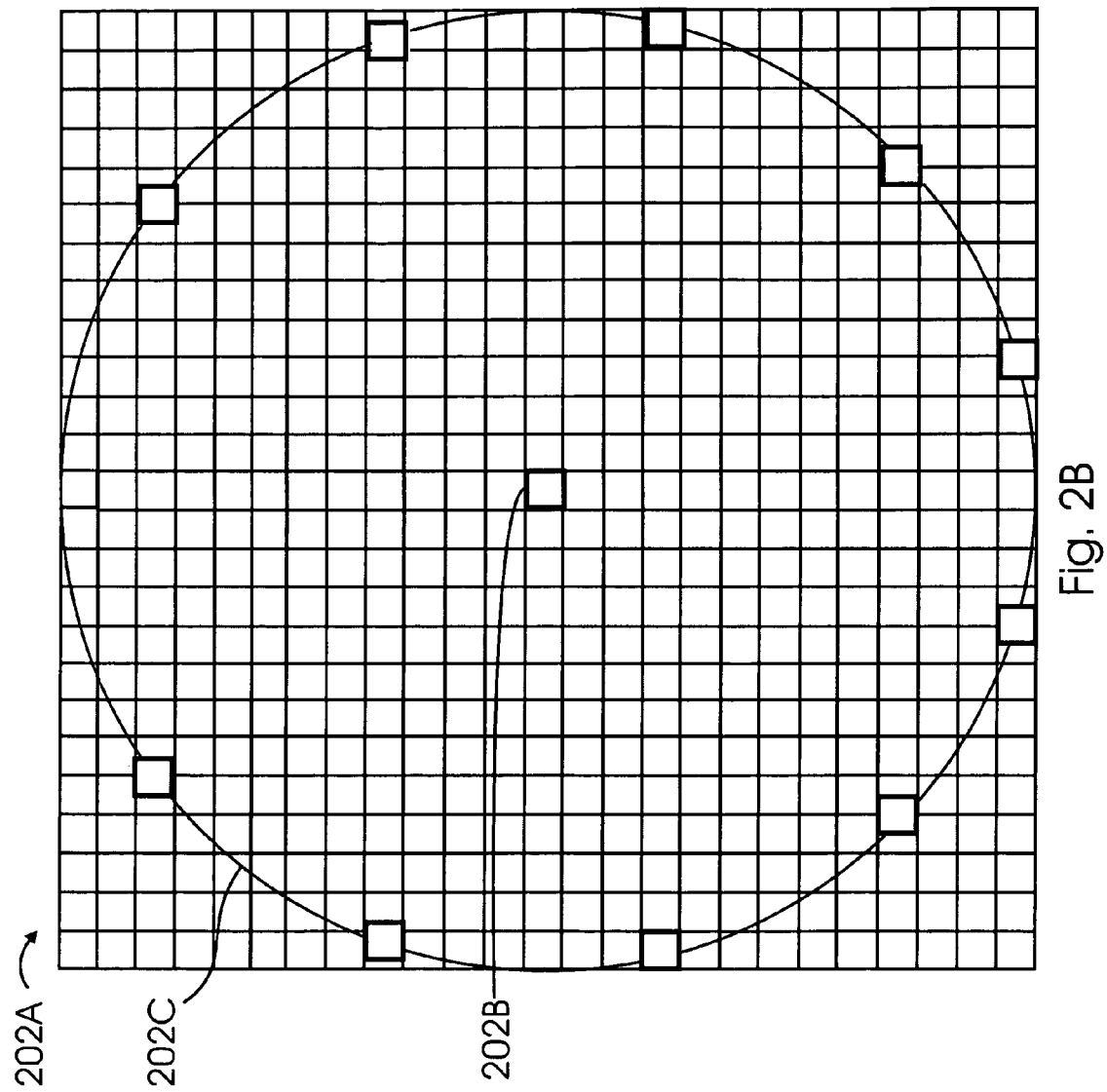
FIG. 2B shows an example of using a ring median filter, according to one aspect of the present invention.

Preprocessor Module 201: The ring median filter 202 eliminates clutter but saves the wire data for further analysis. FIG. 2B shows an example of how a ring median filter 202 is applied. The pixel value for a pixel 202B is replaced by the median value of the dark pixels in image area 202A along the ring (shown as 202C). This eliminates objects with a scale size (length or width) less than ½ ring (202C) diameter. Subtracting this median image from the original image would leave objects with a scale size that is less than ½ of the ring diameter.

Figure 2C:
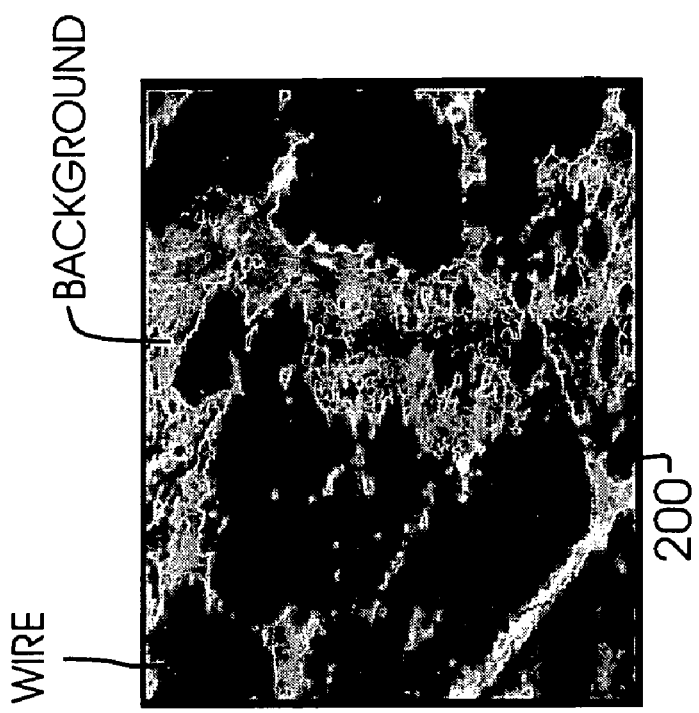
FIG. 2C shows an example of wires with background clutter, according to one aspect of the present invention.

Wires in an image may have low contrast or high contrast compared to the background clutter. The two examples are shown in FIG. 2C with high/low background clutter. Ring median filter 202 is made large enough so that multiple closely spaced wires (as shown in FIG. 2C) are not eliminated. The ring median filtered image 200A is then processed by wavelet de-noise module 203.

Wavelet de-noise module 203 eliminates 2-D wavelet coefficients that are uncorrelated across multiple length scales. Subtracting this filtered image from the original image 200, as shown in FIG. 2A, leaves small-scale features of all contrasts (for example, single wires) and large-scale features with low contrast (for example, multiple wires) intact.

It is noteworthy that instead of using wavelet de-noise module 203, a similar filter (for example, the Susan Filter described below) may be used to produce output 200B that retains single/multiple wires based on contrast and scale selection.

Figure 3:
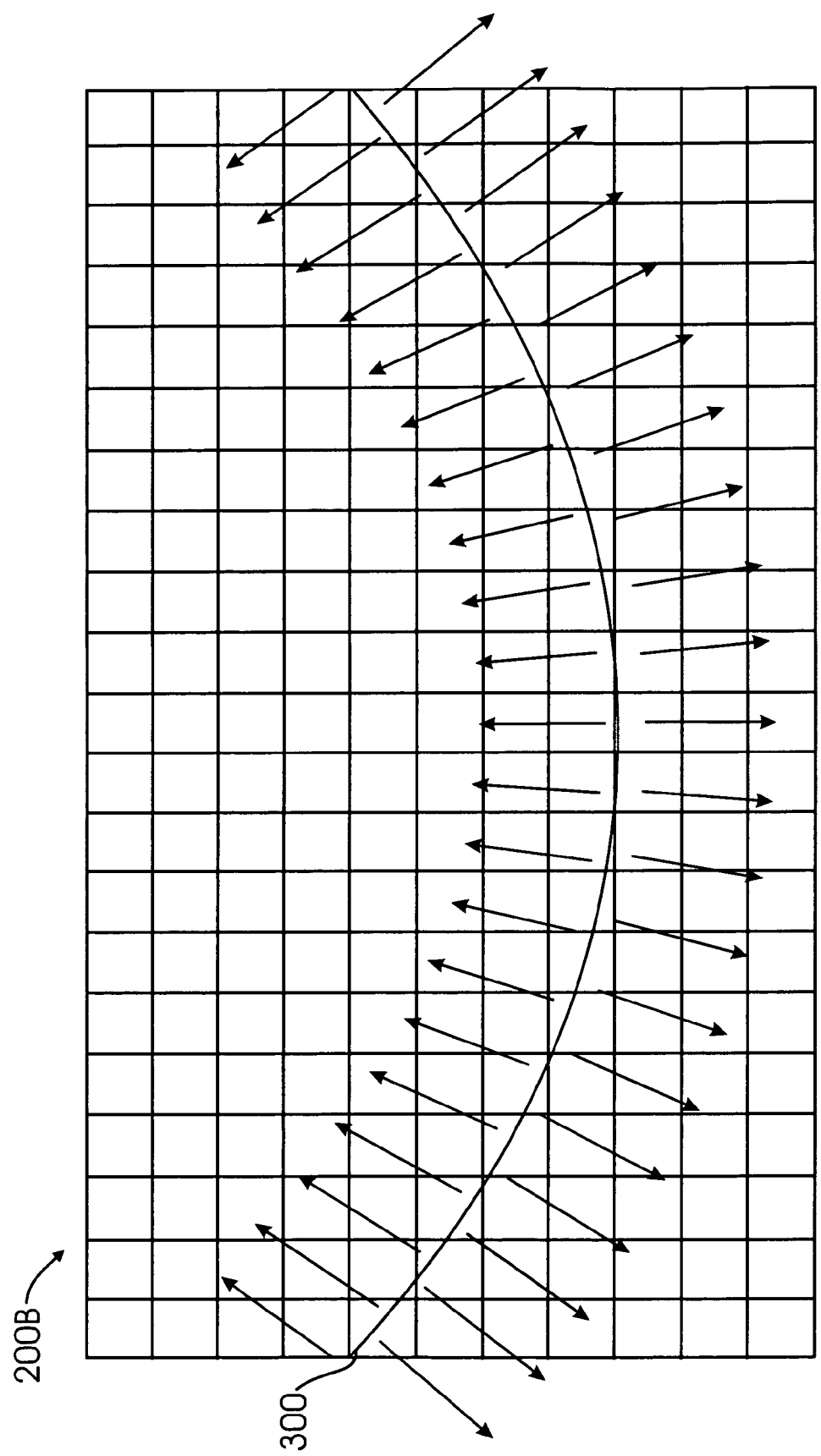
FIG. 3 illustrates an image output after a gradient phase operator is applied.

Segment Finder 204: Segment finder 204 is a prediction tool that identifies potential "wire candidates" based on output 200B. Output 200B is received by a gradient phase module 205. The gradient phase module 205 computes a vector along the local intensity gradient at all pixels in the image scene. For pixels on or very near a wire, this vector will be orthogonal to the wire. Each vector is normalized and, thus, is a unit phasor. This is shown in FIG. 3 with the local intensity gradient of image 200B shown as 300.

Output 200C from the gradient phase module 205 is sent to a vector kernel 207. Vector kernel 207 provides a kernel operator to segregate and identify wire candidates.

Vector kernel 207 provides a kernel that is oriented over each pixel perpendicular to the gradient vector at that pixel. For pixels in the near vicinity of a wire, the kernel will lie along the length of the wire. The normalized two-dimensional vectors, or unit phasors, calculated by the gradient phase module 205 are weighted via the kernel and then summed. The kernel multipliers are positive on one side of the (hypothetical) wire and negative on the other side. If there is a wire, then it will orient the phasors on opposite sides in the same direction and hence the sum will be coherent. The mathematical result is shown as following:

$$\rho_1 e^{i\varphi_1} = \sum_{n=1}^{N} K_n e^{i\theta_n},$$

where $K_n$ is the kernel multiplier for the nth nonzero kernel element (n=1 for the central pixel), and $\theta_n$ is the phase for that element.

For random phase fields, $<\rho_1^2>=N$, and $\phi_1$ is uncorrelated with $\theta_1$.

For perfectly aligned fields, $<\rho_1^2>=0$ (because the positive and negative $K_n$ contributions cancel, and $\phi_1=\theta_1$ (modulo $\pi$).

For a perfectly straight wire, $<\rho_1^2>=N^2$, and $\phi_1=\theta_1$ (modulo $\pi$).

Figure 4A:
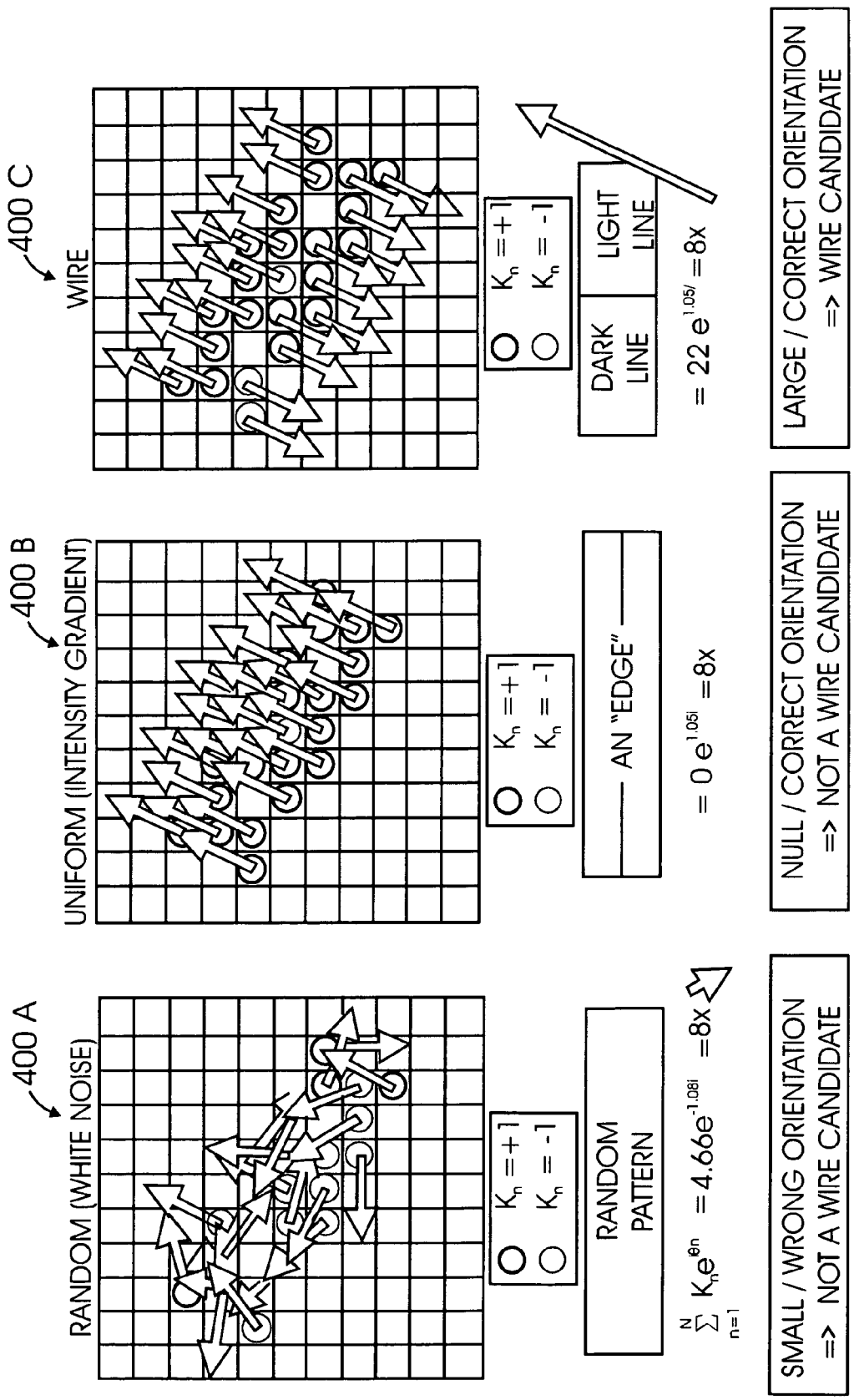
FIG. 4A shows an example of image outputs after a vector kernel operator is applied.

FIG. 4A shows image samples after vector kernel 207 is applied to output 200C. Random white noise is shown as 400A and is not a wire candidate. 400B shows a uniform uni-directional intensity gradient, which is an edge and hence is not considered to be a wire candidate. 400C shows an example of a wire candidate where the 2-D vectors are oriented in opposite directions. 400C is considered to be a wire candidate because it is the only case where the vector kernel produces a strong output coherent with the phase of the central pixel.

Output 200D from vector kernel 207 is sent to a threshold module 208. Threshold module 208 assigns a "1" to pixels with vector kernel outputs satisfying plural conditions, for example, if the magnitude exceeds a programmable threshold, and the absolute value of the phase difference (relative to the gradient phase of the central pixel) is below a programmable threshold. A "0" is assigned to all other pixels. Thus, the final output 200E of segment finder module 204 is a binary image.

Linker Module 209:

Output (binary image) 200E from segment finder module 204 is sent to linker module 209. Linker module 209 receives binary image (200E) and uses a radon-like morphological operator 210 to identify "1" pixels from the input image that are strongly aligned into wire like filaments. Operator 210 uses multiple linear morphological operators, and the structure elements of these operators have different orientations. Each of these morphological operators is centered over each of the "1" pixels in the segment finder output, and the number of segment finder "1" pixels within its structure element are summed. If the sum exceeds a programmable threshold, the identification number of that morphological operator is stored in a memory location associated with the central pixel. Thus, the final output 200F of morphological operator 210 is an array of morphological operator identification numbers, indexed by pixel.

Output 200F from operator 210 is sent to a segment linker accumulator (or buffer) 211 that links various pixels into large-scale lines. Module 211 accumulates data in an empty linker accumulation image buffer. This image buffer is at least the same size as the segment finder binary image output 200E, so their pixels are in one-to-one correspondence. For each pixel index in the operator in output 200F, Module 211 centers each of the morphological operators in output 200F associated with this index over a corresponding pixel in the linker accumulation buffer (211). The value "1" is then added to each of the pixels in the linker accumulation buffer 211 that is overlaid by the structure element of the morphological operator. Since the structure elements are linear, accumulation buffer pixels along or in between linear and curvilinear features will have "1" added to them many times. Thus the final output 200G of the segment linker accumulator 211 is an image with large values along linear and curvilinear features, such as wires, but low (or zero) elsewhere.

A threshold module 212 then applies pre-programmed thresholds to Output 200G from module 211. Every pixel in output 200G of the segment linker accumulator 211 with a value above the threshold is set equal to "1." All other pixels are set equal to "0." Thus, the output 200H of threshold module 212 is a binary image similar to that of segment finder module 204, except with non-wire like features removed and with gaps between aligned wire like features (partially) filled in.

Output 200H from threshold module 212 is then filtered by using spatial and temporal filters 213. The spatial filter eliminates features in output 200H of threshold module 212 that do not have length/width ratios consistent with wires, and the temporal filter eliminates pixels that do not satisfy a minimum threshold for frame-to-frame persistence. The filtered output 214 is a binary wire overlay 214.

The wire overlay 214 is used to determine whether wires have been detected, and the pilot is notified if they have. This notification may be performed by overlaying the wire overlay on the video display output, sounding an audible alarm, or any other means that calls the pilot's attention to the wires. This will allow the pilot to change course and avoid potential catastrophic accidents.

Figure 4B:
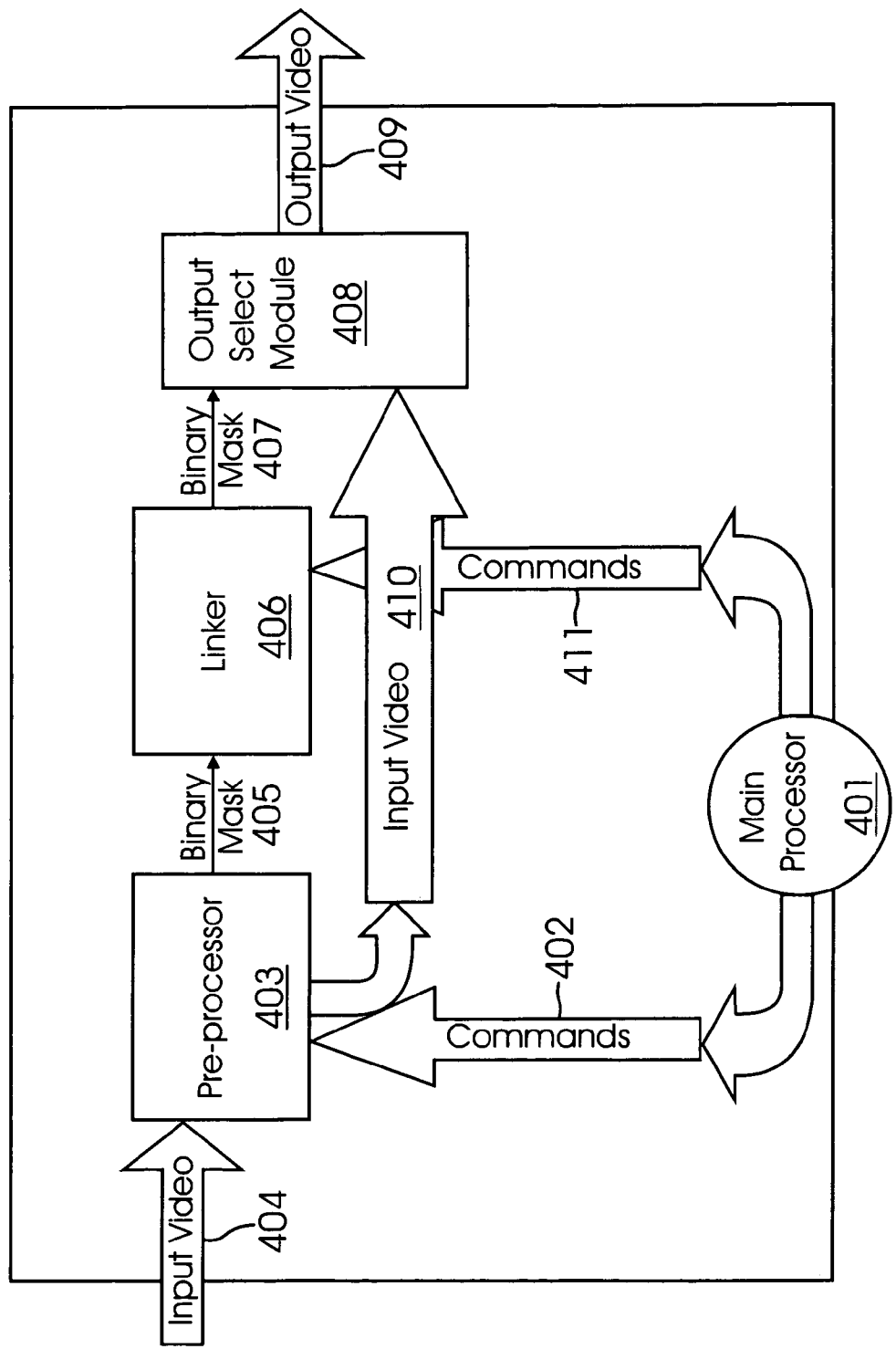
FIG. 4B shows a hardware block diagram for detecting wires, according to one aspect of the present invention.

FIG. 4B shows an example of a FPGA implementation of system 400 for implementing the overall system 102 that has been described above in detail. Various functional components of FIG. 4B are similar to the modules shown in FIG. 2A. System 400 includes a main processor 401 (or state machine) that controls the operations of various modules through commands 402 and 411. Commands 402 and 411 can be used to setup threshold values and other variables to efficiently detect wires.

Input video 404 is received by a pre-processor module 403 that also performs the segment finder (204) functionality as described below. A binary mask or binary output 405 is then sent to a linker module 406. The linker module provides a binary mask 407 that is sent to an output select module 408. In one aspect of the present invention, output select module 408 is a multiplexer that allows a user to select a particular output.

Input video 410 can be used as a reference by a user to detect wires based on binary mask 407. In one aspect binary mask 407 is overlaid on input video 410 to detect wires.

Figure 4C:
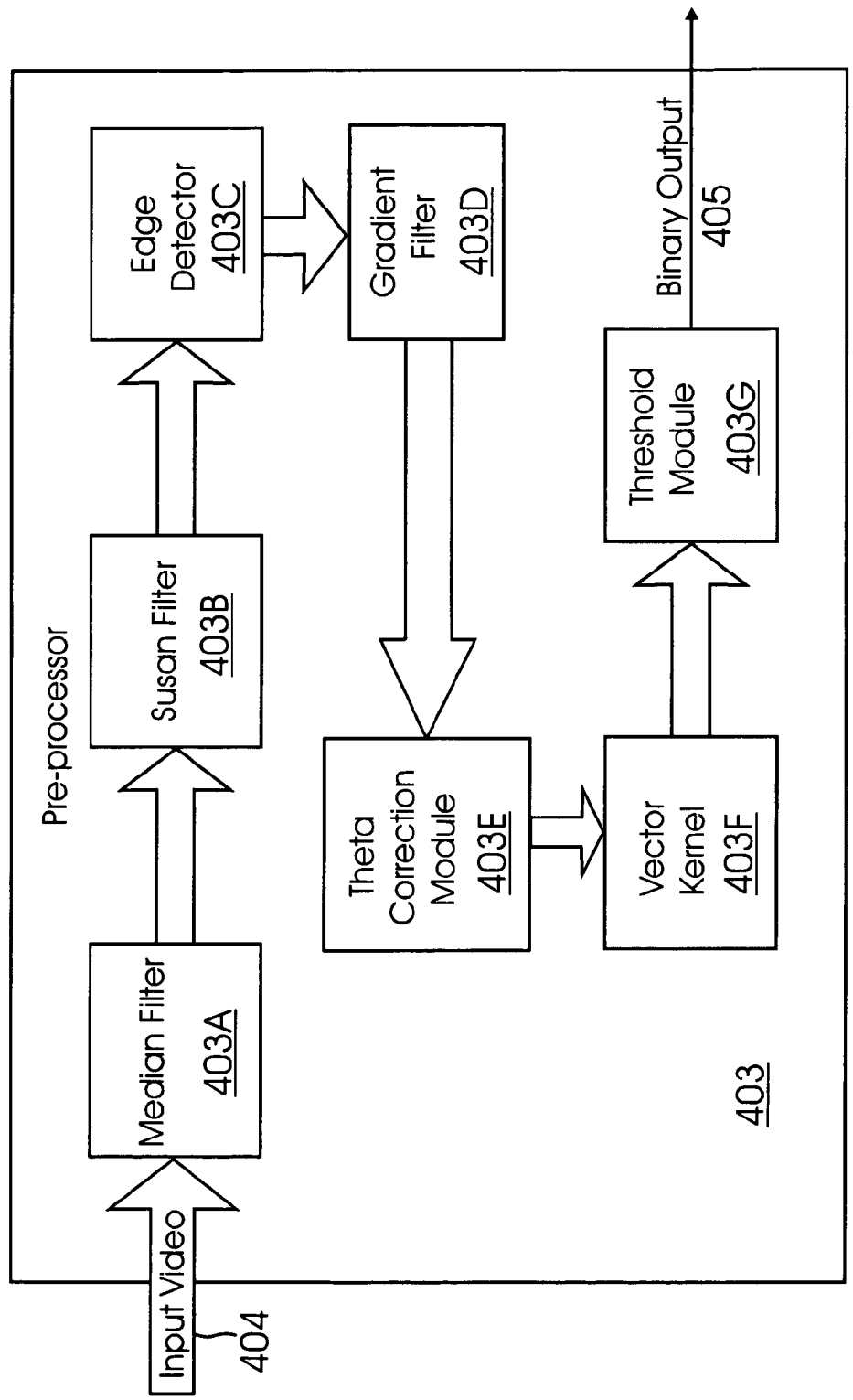
FIG. 4C shows a block diagram of a pre-processor used in the system of FIG. 4B.

FIG. 4C shows a block diagram of pre-processor 403 that receives input video 404. Pre-processor includes a median filter 403A (similar to filter 202 in FIG. 2A). Output from median filter 403A is sent to Susan filter 403B whose functionality is similar to wavelet de-noise module 203 described above with respect to FIG. 2A. Output from Susan filter 403B is sent to an edge detector module 403C that operates as high pass spatial filter using standard coefficients to filter the output received from Susan filter 403B. The filtered output from edge detector 403C is sent to gradient filter 403D.

Figure 4D:
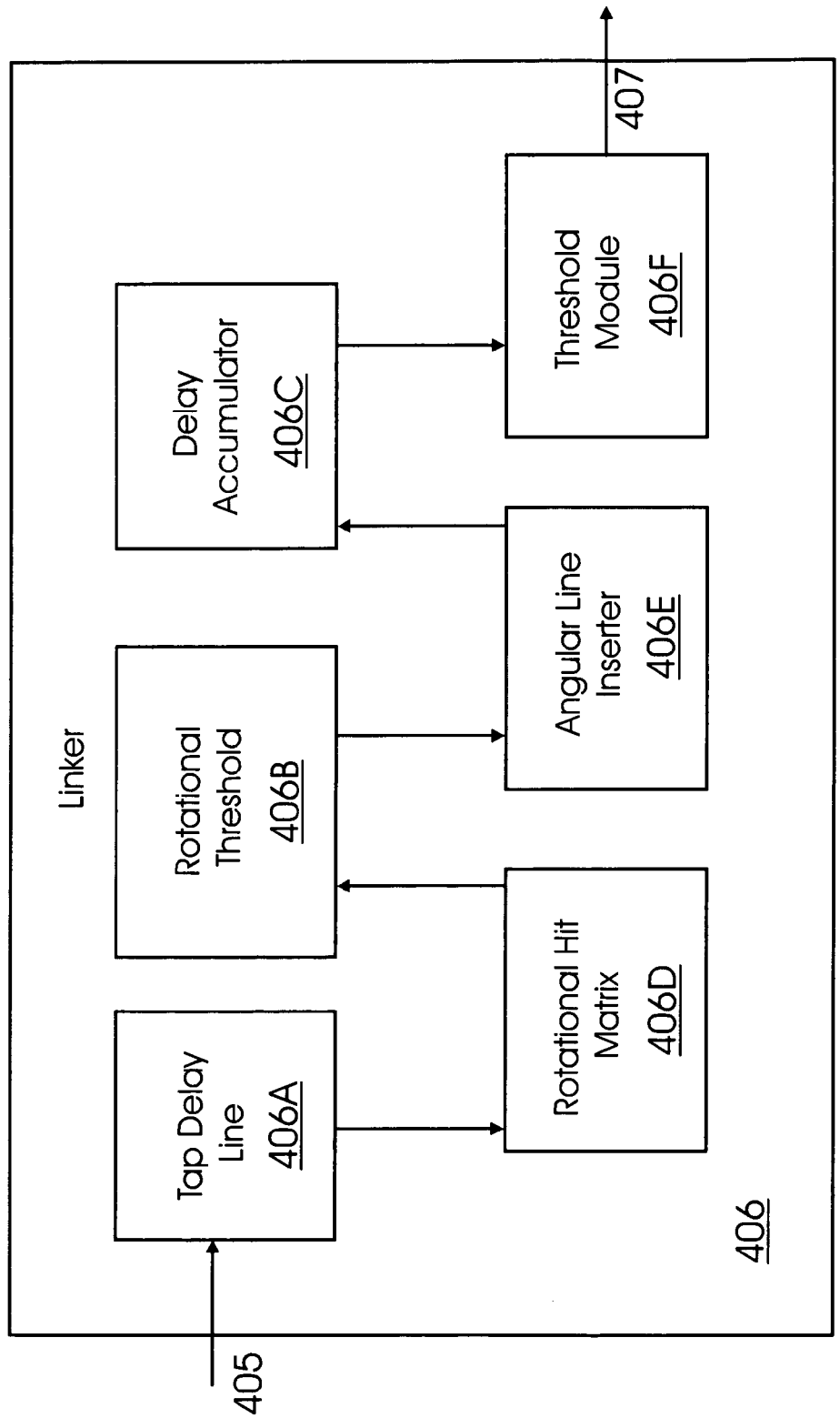
FIG. 4D shows a linker module used in the system of FIG. 4B.

Gradient filter 403D is similar to the gradient phase module 205 that is described above with respect to FIG. 2A. Gradient filter 403D takes the X and Y gradients generated by the edge detector 403C and generates a phase angle (theta) of the resulting vector. The sine and cosine values of the theta are then passed to the theta correction module 403E. This is shown in FIG. 4E where theta can range from zero to 360 degrees (or from zero to 180 degrees on one side and 0 to −180 degrees on the other side). The vector kernel 403F may use a certain number of kernels (for example, 16), hence the theta values from edge detector module 403C are mapped to their corresponding vector kernel orientations by theta correction module 403E.

Figure 4G:
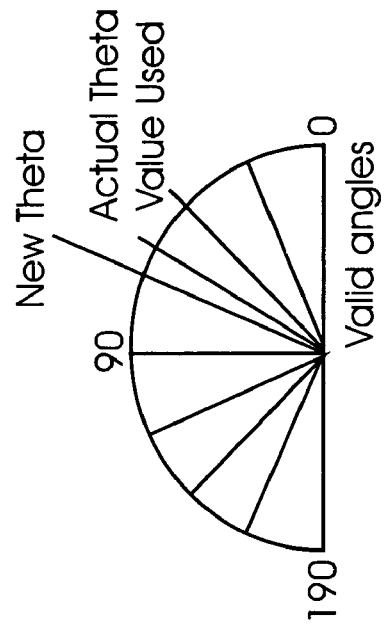
FIGS. 4E-4G illustrate an example of theta correction by theta correction module of the system in FIG. 4B.
Figure 4E:
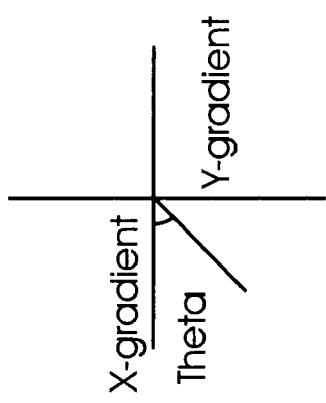
Figure 4F:
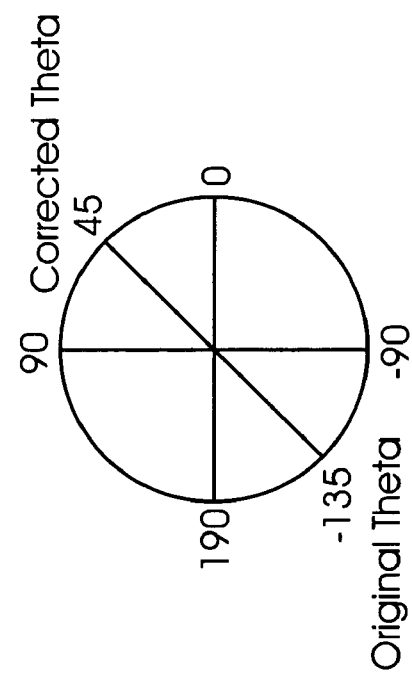

FIGS. 4F and 4G show how the theta values are adjusted so that vector kernel 403F can be used effectively. Every theta value that is between 0 to 180 degrees is kept. Every theta value that is less than zero (i.e. between 180 to 360 degrees), 180 is added. For example, as shown in FIG. 4F, the angle −135 degree becomes 45 degrees (shown as corrected theta). This places the angle in the appropriate quadrant.

Theta correction module 403E is aware of the 16 (or any other number used by kernel vector 403F) angular values used by vector kernel 403F. After the step shown in FIG. 4F, the corrected theta value is rounded to one of the values used by vector kernel 403F. This is shown in FIG. 4G, where the "new theta" value is the corrected theta value. This value is rounded off to the "actual theta" value that is used by kernel vector 403F.

Output from theta correction module 403E is processed by vector kernel 403F (similar to vector kernel 207). Threshold module 403G applies thresholds to the output from vector kernel 403F. Threshold module 403G is similar to the threshold module 208 shown in FIG. 2A. Binary output 405 is then sent to linker module 406.

Linker module 406 shown in FIG. 4D uses a tap delay line 406A to stage the pixel data that it receives from pre-processor 403. The delay is used to align the incoming data. The hardware delay is minor and overall performance is not affected adversely. Binary data is moved from tap delay line 406A to a rotational hit matrix module 406D. Module 406D is similar to module 210. Rotational threshold values 406B are applied to the output from module 406D. These thresholds are similar to those of module 210, so that the angles in the rotational hit matrix that exceed threshold will trigger the corresponding linker accumulator structure element.

Angular line inserter 406E functionality is similar to the functionality of module 211 (FIG. 2A). A delay accumulator 406C then uses a delay line structure to sum the number of times a particular pixel is turned on by the binary mask that comes from 406E. The delay accumulator will increase its count by 1 for every time that the binary mask has a valid pixel that is found for each pixel entry in the frame.

Threshold module 406F applies threshold values similar to module 212 described above. Output 407 from linker 406 is sent to output select module 408 that is then used to send the output video 409 to a user/pilot.

Figure 2C:
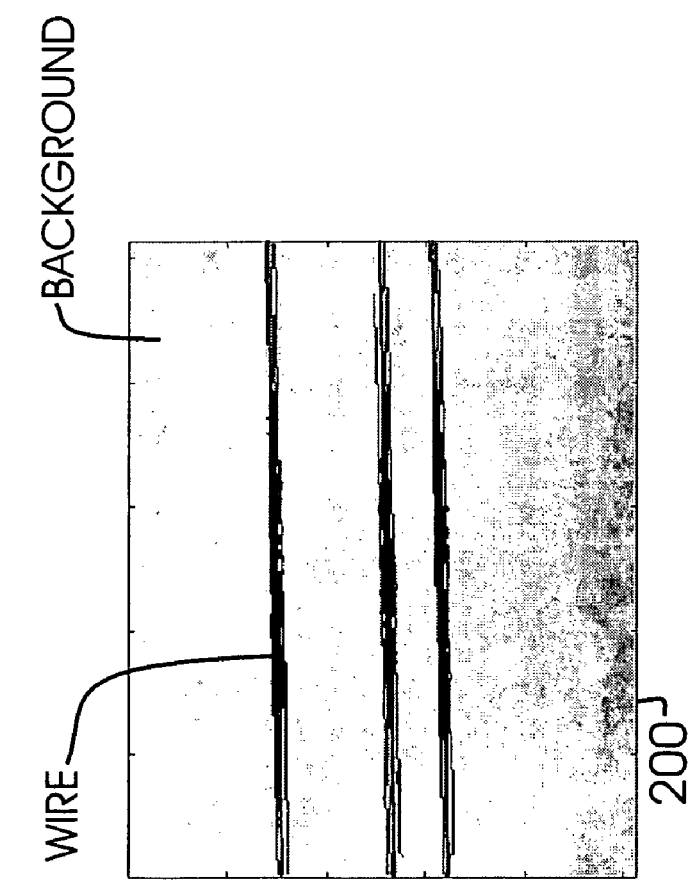
Figure 5A:
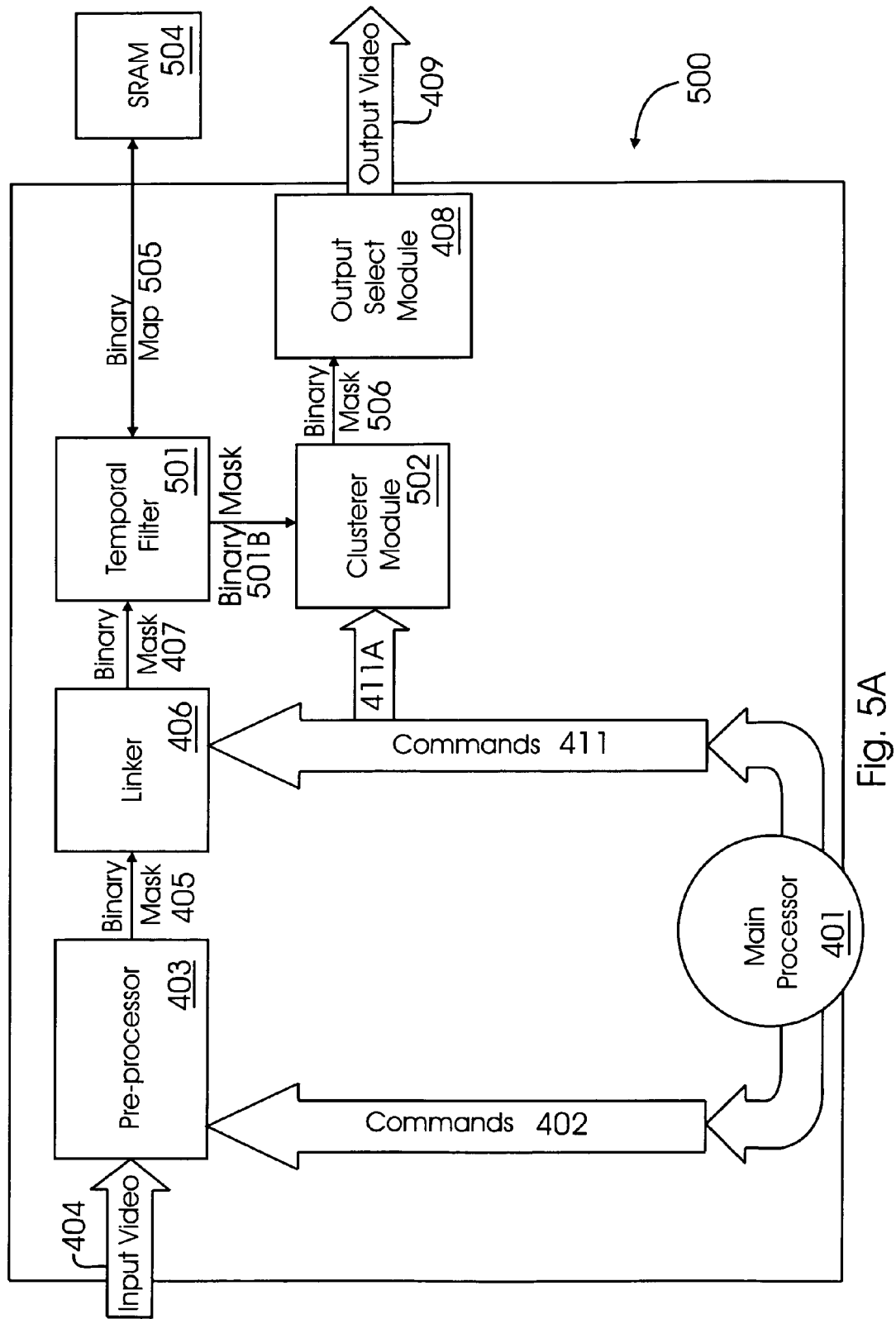
FIG. 5A shows yet another example of a hardware system used to detect wires, according to one aspect of the present invention.
Figure 5B:
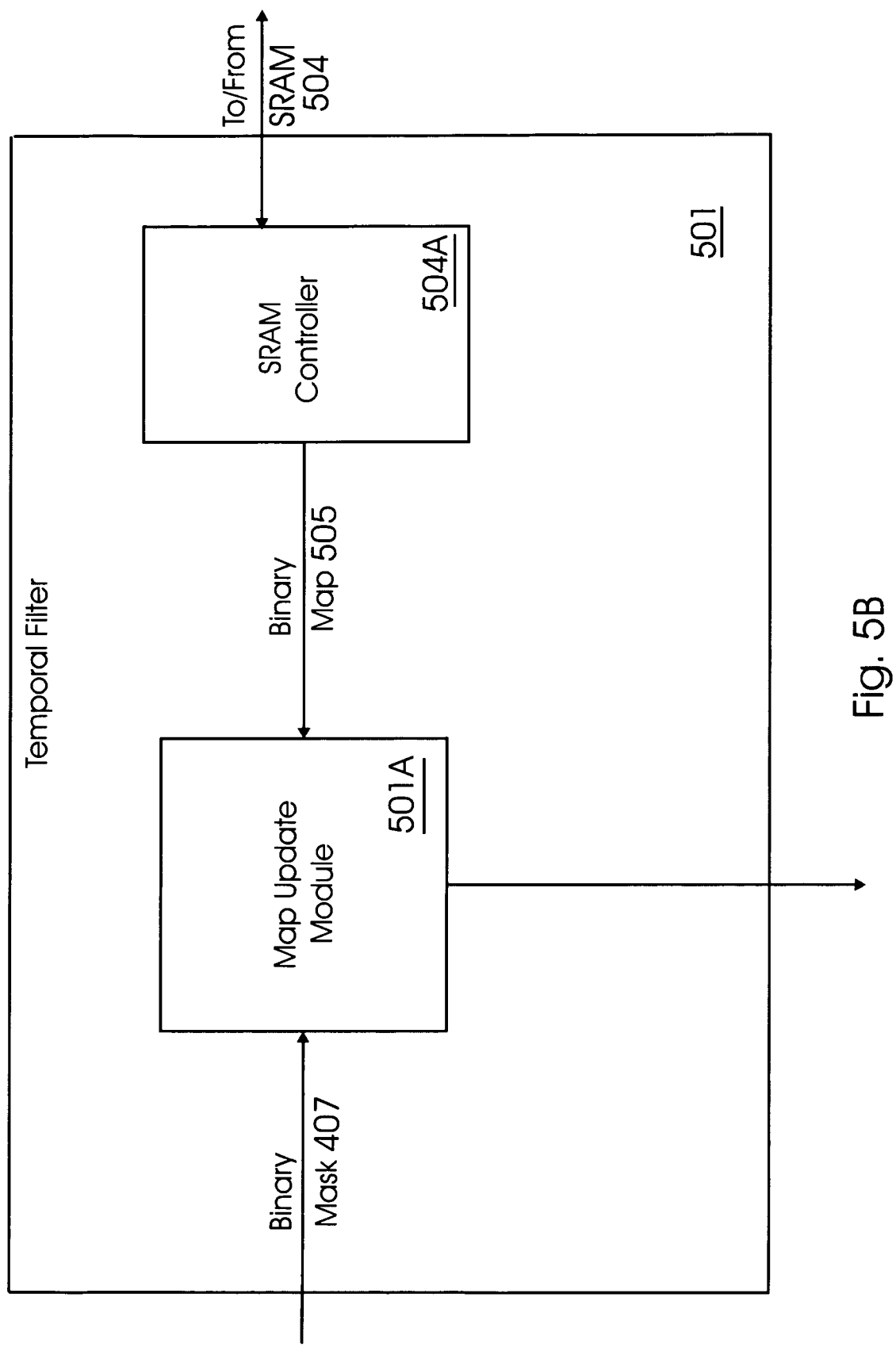
FIG. 5B shows a block diagram of a temporal filter module used in the system of FIG. 5A.

FIG. 5A shows yet another block diagram of a system 500A for efficiently detecting wires, according to one aspect of the present invention. System 500 has various components that are similar to the components in FIG. 4 and FIG. 2. System 500 uses a binary map 505 received from memory 504. In one aspect, memory 504 is static random access memory "SDRAM". Binary map 505 provides previous image data that are wire like. The binary map is sent to a temporal filter module 501 that is described below with respect to FIG. 5B.

Binary mask 407 is received by map update module 501A that updates the binary mask based on binary map 505. Temporal filter module 501 may also include a memory controller 504A (shown as SRAM controller for a SRAM 504) that manages transfer of binary map 505 from SRAM 504 to update module 501A. In one aspect, both temporal filter 501 and SRAM 504 run on the same clock to avoid delays or synchronization problems. Updated binary mask 501B is sent to a cluster module 502 (shown as "Clusterer" in FIG. 5A) that is controlled by processor 401 commands (411A). Cluster module 502 scans through an image, one line at a time so that non-local information is obtained, i.e., how the pixels are joined together. Module 502 assigns sub-cluster/cluster numbers to the various image pixels and creates a cluster map. These assignments are then used to approximate the length/width ratio of contiguous clusters so that clusters with non wire like length to width ratios can be eliminated.

Figure 5C:
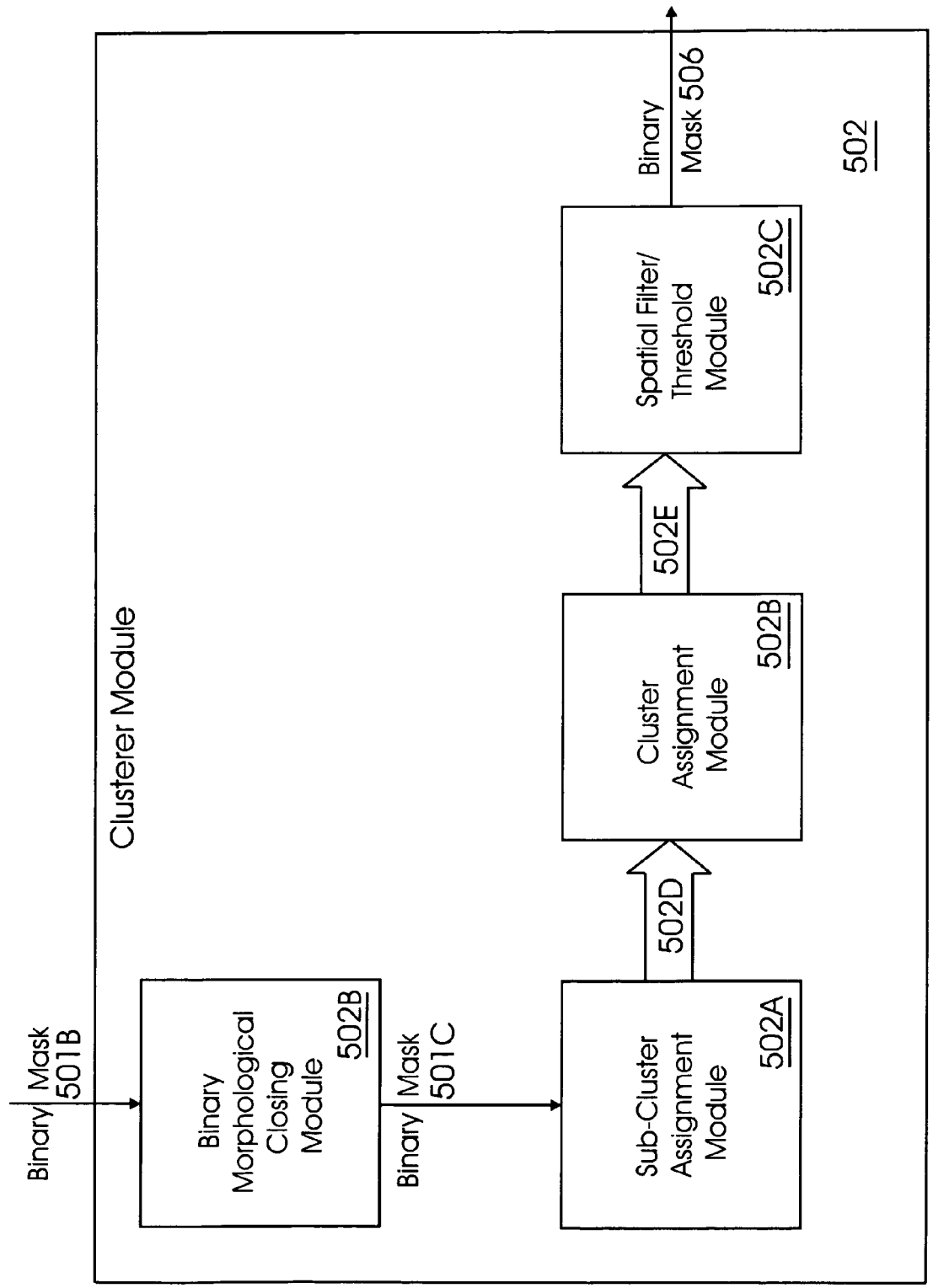
FIG. 5C shows a block diagram of a clusterer module used in the system of FIG. 5A.

FIG. 5C shows a block diagram for cluster module 502. Updated binary mask 501B is received by a binary morphological closing module 502B. Module 502B fills in gaps in a binary video data stream (501B). For example, if the binary mask 501B has holes in wire like structures, then module 502B is used to fill in these holes.

Output 501C from module 502B is sent to a sub-cluster module 502A. Output 502D from module 502A is sent to a cluster module 502F that generates output 502E. Spatial filter/threshold module 502C receives output 502E and generates a binary mask 506 that is sent to the output select module 408. The functionality of modules 502A, 502F and 502C are discussed below in detail with respect to FIGS. 5D, 5E, 5F, 5G and 5H.

Figure 5D:
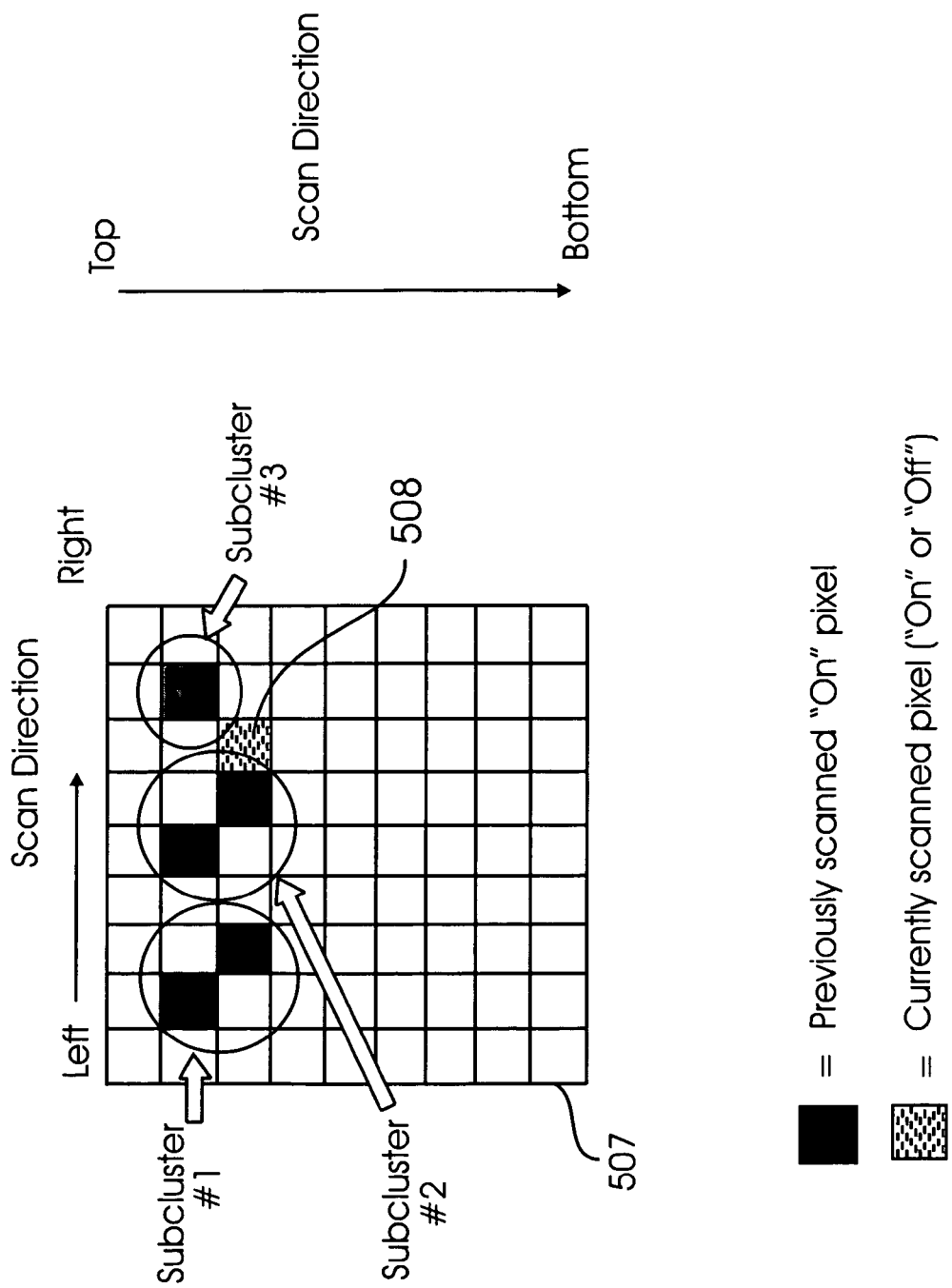
FIGS. 5D-5H illustrate how sub-clusters/clusterer assignments are handled by the clusterer module, according to one aspect of the present invention.

To aid in the elimination of pixel clusters with length/width ratios inconsistent with wire like structures, a connected-components strategy employing sub-clustering and clustering is used. This to identify contiguous groups of "1" pixels in the binary output from the temporal filter module 501 and eliminate those that are not wire like. A contiguous group containing all horizontal, vertical, and diagonal nearest neighbor "1" pixels for every "1" pixel in the group is identified as a "cluster." As illustrated below, because the image is scanned pixel-by-pixel, it is not always possible to know whether two pixels belong to the same cluster until well after both have been scanned. To aid in the pixel connectivity bookkeeping, "1" pixels are assigned to sub-clusters as they are scanned, and the system monitors collisions between the growing sub clusters as each new pixel is scanned, identifying all mutually colliding sub-clusters with a single cluster The sub-cluster number, or ID, for any pixel does not change, but the cluster numbers of colliding sub-clusters are consolidated to a single cluster number Thus, each "1" pixel is directly assigned an unchanging sub-cluster number and indirectly assigned a varying cluster number via the cluster number of its corresponding sub-cluster. An image is scanned left to right and top to bottom, as shown in FIG. 5D by module 502A. FIG. 5D shows "on" pixels, or "1" pixels, that have been previously scanned in an image 507 and a currently scanned pixel (508).

As the image is scanned, each "On" pixel is assigned a sub-cluster number by module 502A (FIG. 5C). FIG. 5D shows three sub-clusters, 1, 2 and 3 with previously scanned "on" pixels. If a newly scanned pixel (for example, 508) is "on" and is not adjacent to any existing sub-cluster, then the pixel is assigned a new sub-cluster number. If a current "on" pixel is adjacent to other sub-clusters then it is assigned either the larger or smaller sub-cluster number. For example, pixel 508 is close to sub-cluster 3 and sub-cluster 2 and may be assigned either sub-cluster 2 or 3, as long as this assignment is performed consistently.

Figure 5E:
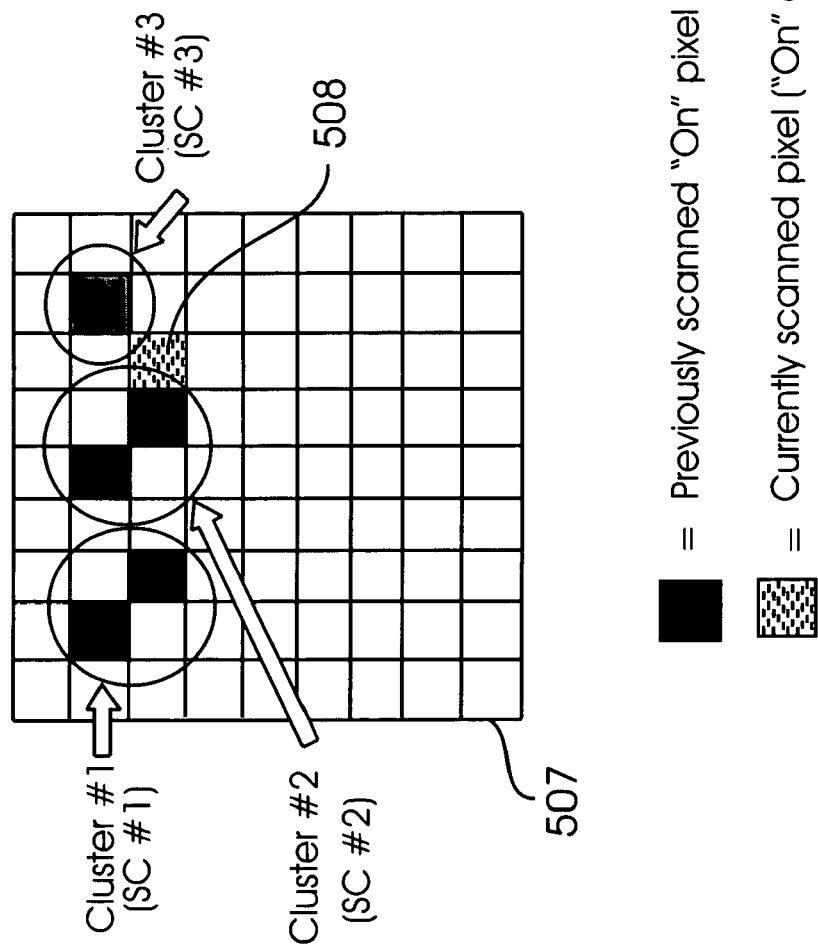

After the sub-cluster assignment, each sub-cluster is assigned a cluster number by module 502F. This cluster number changes, as the image is scanned, as shown in FIG. 5E. For example, if a newly scanned "on" pixel (508) is not adjacent to any existing sub-cluster, then the pixel is assigned a new sub-cluster number and the sub-cluster is assigned a new cluster number. Each sub-cluster adjacent to a newly scanned "on" pixel is assigned the smallest cluster number. For example, as shown in FIG. 5E, pixel 508 is assigned to sub-cluster 3, but then sub-cluster 3 is assigned to cluster 2 since pixel 508 is closest to cluster 2. Hence, cluster 3 merges into cluster 2.

Figure 5F:
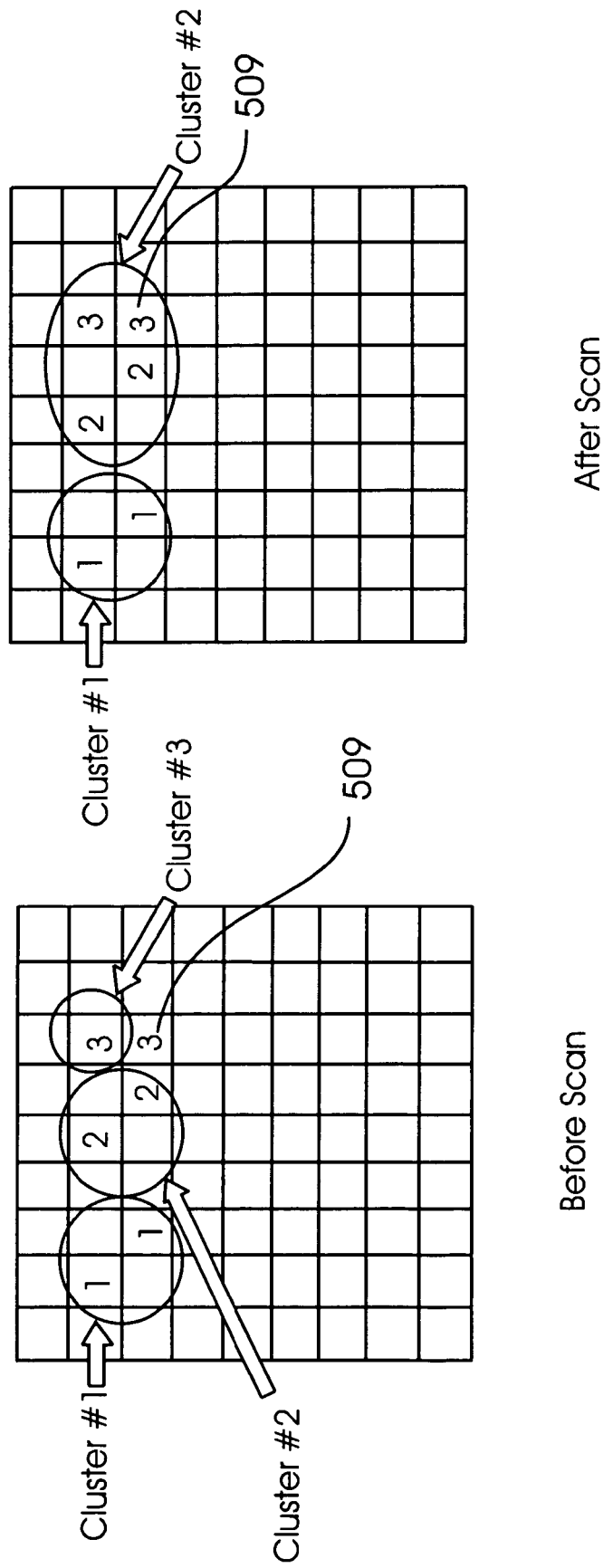

FIG. 5F shows an example of what happens when the clusters are merged before and after a scan. The pixel numbers in this figure are the sub-cluster numbers for the previously scanned "1" pixels. The Figure illustrates the cluster state before and after "1" pixel 509 is scanned. In the before scan segment, pixel 509 is adjacent to cluster number 2 and 3. After the scan by module 502F, pixel 509 becomes a part of cluster 2 since cluster 3 merges with cluster 2.

Figure 5G:
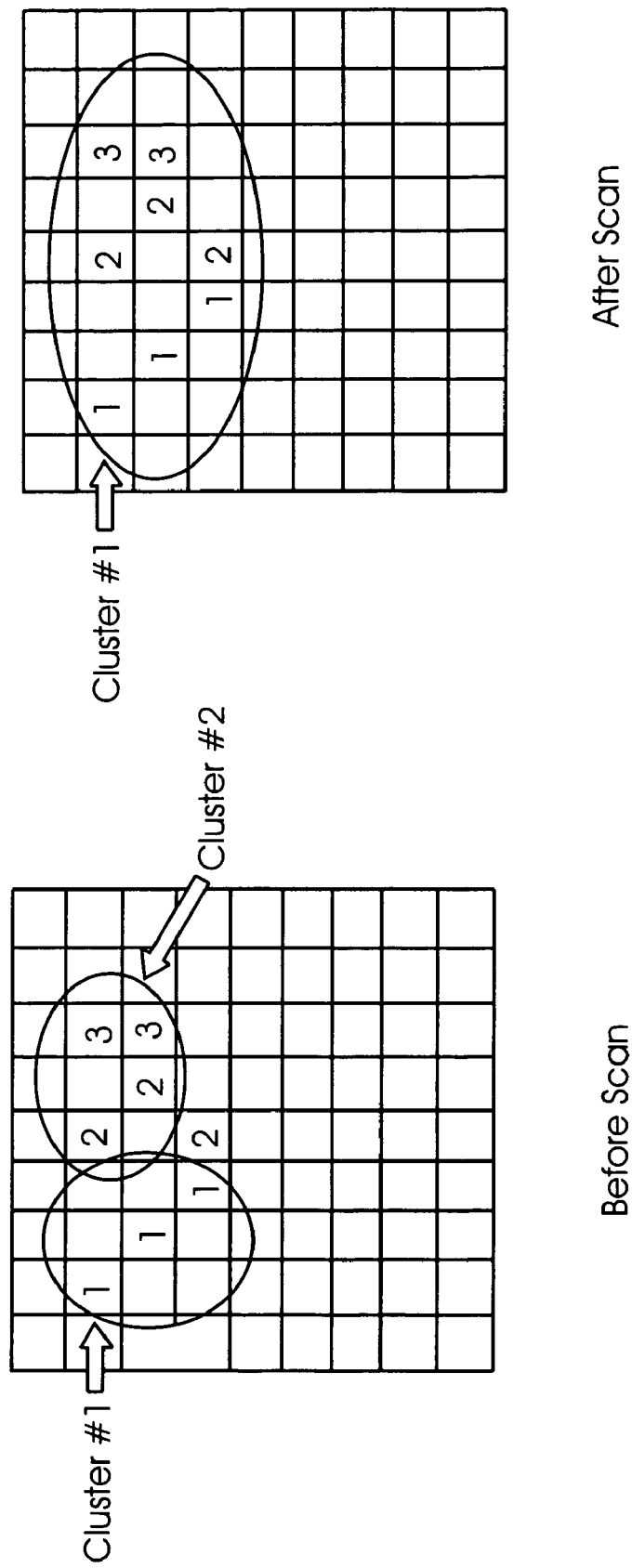

FIG. 5G further illustrates the merging concept, according to one aspect of the present invention. The "Before Scan" segment shows the cluster state before the sub-cluster #2 pixel on the lower line is scanned, and the "After Scan" shows the cluster state after this pixel has been scanned. Cluster #2 merges with cluster number 1, as shown in the "After Scan" segment.

Figure 5H:
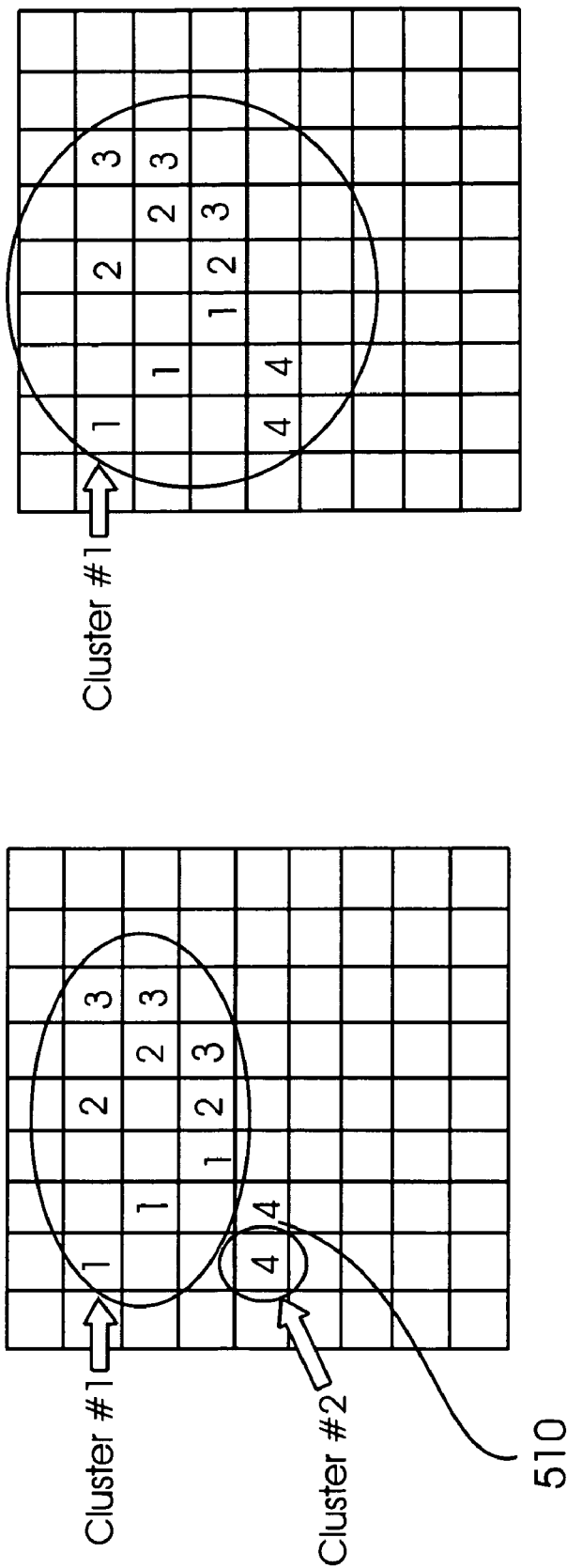

FIG. 5H further illustrates the merging concept. In this example, pixel 510 is close to cluster number 2 before the scan. After the scan, pixel 510 and cluster number 2 merge with cluster number 1.

Module 502F eliminates completed clusters below a programmable size and length. A cluster size is determined by the number of pixels that are in the cluster. A cluster's length is the maximum contiguous pixel to pixel distance between any pair of pixels within the cluster. Completed clusters above a programmable width are also eliminated. A cluster's width is heuristically defined to be the cluster size divided by the cluster length.

Output 502E from module 502F is sent to spatial filter threshold module 502C, which applies the length and width thresholds mentioned above. The output 506 from module 502 is then sent to output select module 408 and then is sent out as output video 409.

Figure 5K:
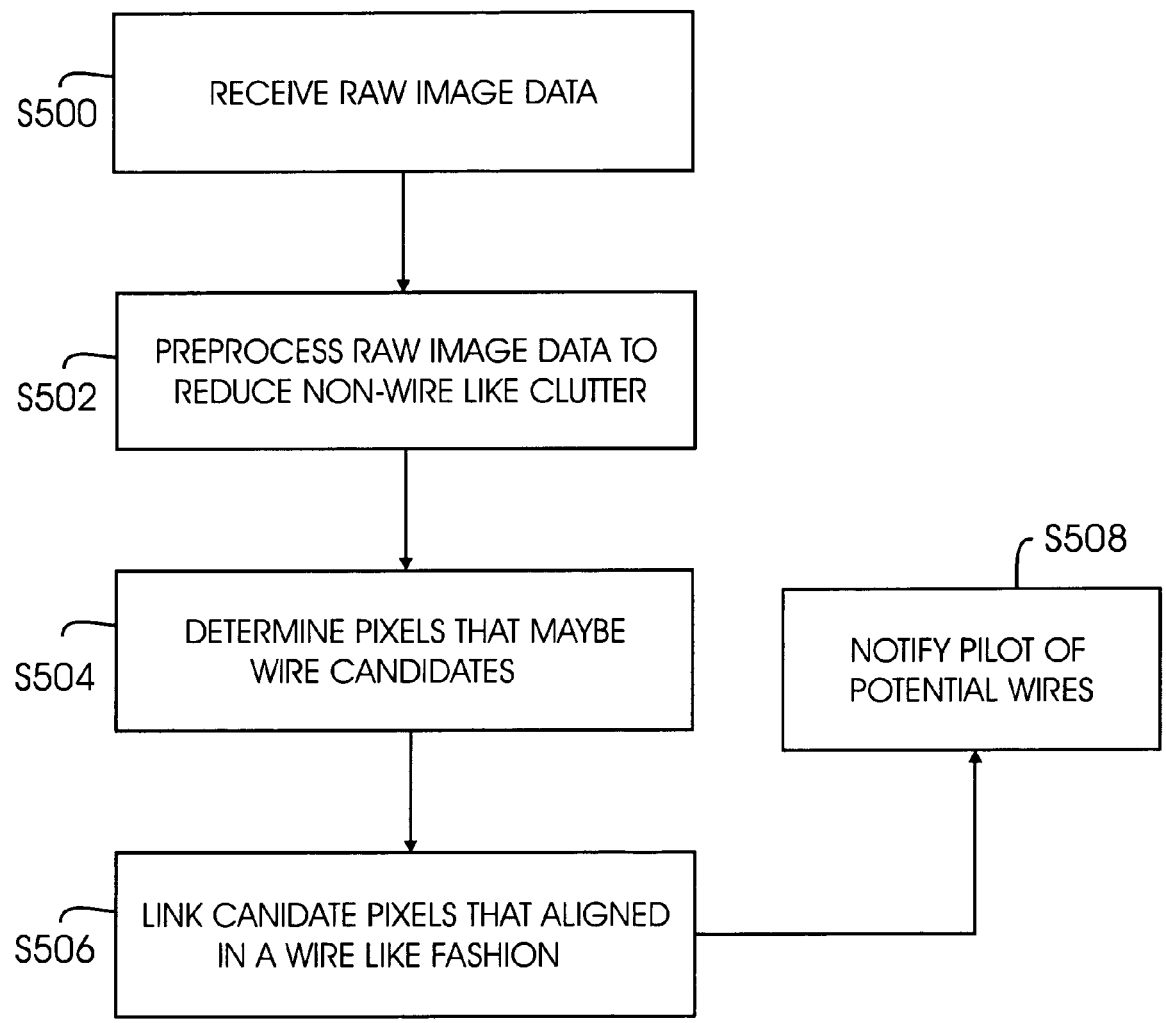
FIG. 5K is a process flow diagram for passive wire detection, according to one aspect of the present invention.

Process Flow Diagram:

FIG. 5K shows a process flow diagram for passively detecting wires from a transport system (for example, a helicopter), according to one aspect of the present invention. This is based on real-time image processing.

Turning in detail to FIG. 5K, in step S500, a raw digital image 200 is received from a digital camera(s) that is mounted on a helicopter (as shown in FIG. 1B). The image is received by a processing system, an example of which is shown in FIG. 2A/4B/5A.

In step S502, the raw image is pre-processed so that non-wire like clutter (if present) in the input image 200/404 is reduced. Pre-processing module 403 (or 201) is used to reduce the non-wire like clutter.

After the image is pre-processed, in step S504, the system shown in FIGS. 2A, 4B and/or 5A determine "wire-like" candidates. Segment finder 204 applies a gradient phase module 205 and a vector kernel 207 to determine the wire like candidates. A threshold module 208 is used to filter out non-wire like pixels from the output 200D from vector kernel 207. It is noteworthy that this function in the systems of FIGS. 4B and 5A is performed by the pre-processor module 403.

In step S506, the "wire like" pixel candidates are linked to determine if a wire is actually present. Linker 406 (or 209) is used to perform this operation, as described above.

In step S508, if a wire is detected (based on output 214/output 409), the pilot is notified. The pilot can then steer the helicopter away from the wires and avoid catastrophic accidents. It is noteworthy that the output 214/409 may be sent to a central computing system of the helicopter and can be used to automatically steer away the helicopter.

In one aspect, wires can be detected real-time without using active sensors and hence, accidents can be avoided without comprising security.

It is noteworthy that the foregoing illustrations based on a helicopter contacting stationery wires are not intended to be limiting. The real image processing techniques are intended to be used for any transport system that needs to avoid collision based on any objects that are difficult to detect.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A hardware system for passively detecting wires from a mobile transportation system, comprising:
   a main processor in the hardware system configured to use plural commands to manage a preprocessor module, a linker module, and a cluster module;
   wherein the pre-processing module is configured to pre-process a digital image taken from a digital camera of the transport system, reduce non-wire clutter from the digital image, and identify pixels that can be classified as representing one or more wires;
   the linker module is configured to link the identified pixels to determine if one or more wires is present; and
   the cluster module is configured to scan the image to obtain non-local information, assign cluster and sub-cluster numbers to pixels, and create a cluster map.

2. The hardware system of claim 1, wherein the pre-processing module applies a Susan filter to the digital image to eliminate clutter and retain portions of the digital image for further processing.

3. The hardware system of claim 1, wherein the transport system is a helicopter or an aircraft.

4. The hardware system of claim 1, wherein the hardware system is based on a field programmable gate array.

5. A hardware system for passively detecting wires from a mobile transportation system, comprising:
   a main processor in the hardware system configured to use plural commands to manage a preprocessor module and a linker module;
   wherein the pre-processing module is configured to pre-process a digital image taken from a digital camera of the transport system, reduce non-wire clutter from the digital image, and identify pixels that can be classified as representing one or more wires;
   the linker module is configured to link the identified pixels to determine if one or more wires is present and a binary output from the linker module is sent to an output select module that allows a user to select a video output; and
   the pre-processing module includes a theta correction module configured to receive an input from a gradient filter and map a theta value that is closest to a theta value used by a vector kernel operator.

6. The hardware system of claim 5, wherein the gradient filter is configured to receive X and Y gradients generated by an edge detector and generate a phase angle of a resulting vector.

7. The hardware system of claim 5, wherein the theta correction module is configured to keep all theta values between 0° and 180° and to add 180° to all theta values between 0° and −180°.

8. The hardware system of claim 5, wherein the vector kernel operator is configured to segregate and identify wire candidates.

9. The hardware system of claim 5, wherein the vector kernel operator is configured to provide a kernel oriented over each pixel perpendicular to a gradient vector at that pixel.

10. The hardware system of claim 9, wherein for pixels in the near vicinity of a wire, the kernel lies along a length of the wire.

11. A hardware system for passively detecting wires from a mobile transportation system, comprising:
    a main processor in the hardware system configured to use plural commands to manage a preprocessor module and a linker module;
    wherein the pre-processing module is configured to pre-process a digital image taken from a digital camera of the transport system, reduce non-wire clutter from the digital image, and identify pixels that can be classified as representing one or more wires;
    the linker module is configured to link the identified pixels to determine if one or more wires is present and a binary output from the linker module is sent to an output select module that allows a user to select a video output; and
    a memory provides a binary map to a temporal filter so that a binary mask obtained from the linker module is updated based on historical binary data.

12. The hardware system of claim 11, wherein the temporal filter provides a binary mask to a clustering module that assigns sub-clusters and clusters to image pixels in the binary mask received from the temporal filter.

13. The hardware system of claim 11, wherein the temporal filter is configured to eliminate pixels that do not satisfy a minimum threshold for frame-to-frame persistence.

14. The hardware system of claim 11, wherein the temporal filter includes a memory controller that manages transfer of a binary map from memory to a map update module 501A.

* * * * *

UNITED STATES PATENT AND TRADEMARK OFFICE
CERTIFICATE OF CORRECTION

PATENT NO. : 7,466,243 B2
APPLICATION NO. : 11/249955
DATED : December 16, 2008
INVENTOR(S) : Christian C. Witt et al.

It is certified that error appears in the above-identified patent and that said Letters Patent is hereby corrected as shown below:

At column 1, line 8, the US patent application Ser. No. "11/184,572" should read as "11/184,472".

Signed and Sealed this

Seventeenth Day of February, 2009

JOHN DOLL
*Acting Director of the United States Patent and Trademark Office*